United States Patent
Ochiai et al.

[19]

[11] Patent Number: 6,002,221
[45] Date of Patent: Dec. 14, 1999

[54] CONTROL SYSTEM FOR AN ELECTRIC VEHICLE

[75] Inventors: Shinobu Ochiai; Kazuhiro Hara, both of Wako, Japan

[73] Assignee: Honda Giken Kogyo Kabushiki Kaisha, Tokyo, Japan

[21] Appl. No.: 09/037,046

[22] Filed: Mar. 9, 1998

[30] Foreign Application Priority Data

Mar. 11, 1997 [JP] Japan ................................ 9-055778

[51] Int. Cl.⁶ .................................................... H02P 1/00
[52] U.S. Cl. ........................ 318/139; 318/801; 318/811
[58] Field of Search ........................... 318/139, 140–158, 318/798–817

[56] References Cited

U.S. PATENT DOCUMENTS

| | | | |
|---|---|---|---|
| 4,585,085 | 4/1986 | Handel et al. | 180/65.2 |
| 4,761,726 | 8/1988 | Brown | 363/51 |
| 4,902,954 | 2/1990 | Oshima et al. | 318/762 |
| 4,933,622 | 6/1990 | Fox et al. | 320/1 |
| 5,034,669 | 7/1991 | Sako et al. | 318/376 |
| 5,036,263 | 7/1991 | Yamada et al. | 318/116 |
| 5,179,842 | 1/1993 | Kanazawa . | |
| 5,266,881 | 11/1993 | Hoffman et al. | 320/21 |
| 5,412,293 | 5/1995 | Minezawa et al. | 318/376 |
| 5,442,250 | 8/1995 | Stridsberg | 310/186 |
| 5,449,993 | 9/1995 | Davis | 318/701 |
| 5,511,866 | 4/1996 | Terada et al. | 303/152 |
| 5,563,479 | 10/1996 | Suzuki | 318/139 |
| 5,617,308 | 4/1997 | Weise et al. | 363/98 |
| 5,619,107 | 4/1997 | Shinohara et al. | 318/139 |

*Primary Examiner*—David Martin
*Attorney, Agent, or Firm*—Nikaido, Marmelstein, Murray & Oram LLP

[57] ABSTRACT

A system is provided to clearly determine a problem in the discharge of a capacitor provided for an inverter of an electric vehicle and its cause. If a capacitor voltage drops below a predetermined value at the end of a first predetermined time period after a main contactor is turned off, it is determined that the main contactor and a discharge circuit are normal. If the capacitor voltage drops below the predetermined value for the first time after a second predetermined time period, it is determined that the discharge circuit has failed and discharge is performed by a discharge resistor. If the capacitor voltage is still above the predetermined value after the second predetermined time period, it is determined that the main contactor has failed and is fixed in a turned-on state.

4 Claims, 4 Drawing Sheets

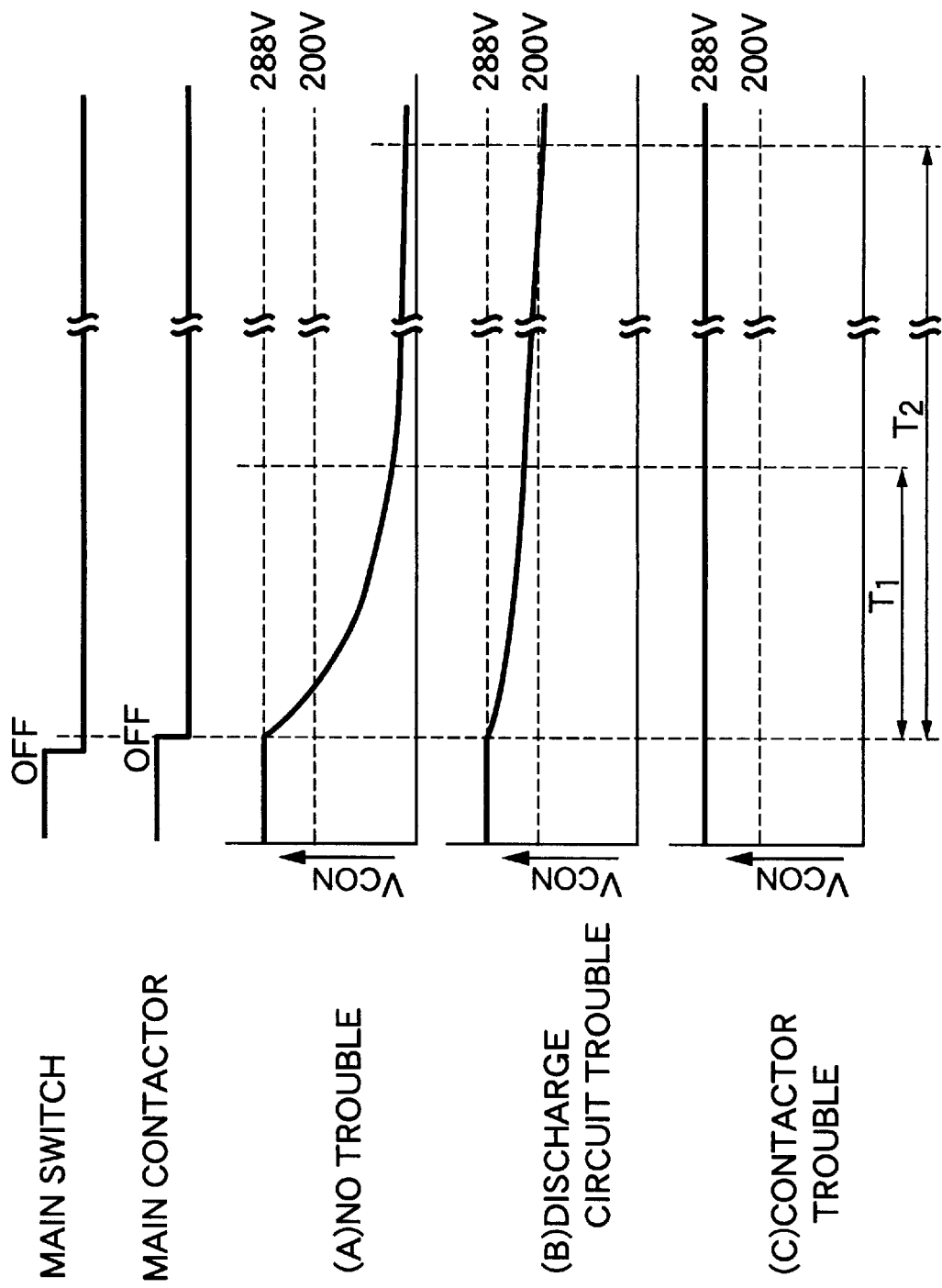

CONTROL SYSTEM FOR AN ELECTRIC VEHICLE

BACKGROUND OF THE INVENTION

1. Field of the Invention

The present invention relates to a control system for an electric vehicle provided with an inverter for converting DC electric power of a main battery into AC electric power to drive a traveling motor.

2. Description of the Prior Art

A large-capacity electrolytic capacitor is provided between terminals of the input side of an inverter of an electric vehicle in order to smooth the fluctuation of voltage and stabilize the operation of the inverter. To run the electric vehicle, a traveling motor is driven through the inverter by closing a contactor by operating a main switch and charging the capacitor. To stop the traveling of the electric vehicle, the electric charge stored in the capacitor is discharged through a discharge circuit after opening the contactor by operating the main switch (see Japanese Patent Application No. 6-161535).

However, because failure of the discharge circuit or the contactor cannot be determined in the prior art, a discharge problem with the capacitor might occur if the discharge circuit or the contactor fails.

SUMMARY OF THE INVENTION

The present invention is made to solve the above problems and its object is to reliably determine discharge problems for a capacitor for an inverter of an electric vehicle and the cause of the problem.

To achieve the above object, according to one aspect and feature of the present invention, there is provided a control system for an electric vehicle, comprising a main battery, a traveling motor, an inverter for converting DC electric power of the main battery into AC electric power to drive the traveling motor, a contactor connected between the main battery and the inverter, a smoothing capacitor connected in parallel with the inverter, a discharge circuit connected in parallel with the inverter to discharge electric charge of the capacitor, within a first predetermined time period, a discharge resistor connected in parallel with the capacitor, for discharging the electric charge of the capacitor within a second predetermined time period, the second time period being longer than the first predetermined time period; and control means for starting the discharge of the capacitor by operating a discharge circuit when opening the contactor, wherein the control means determines a failure of the discharge circuit if a capacitor voltage is equal to or greater than a reference value at the end of the first predetermined time period and is lower than the reference value at the end of the second predetermined time period, and further determines a failure of the contactor if the capacitor voltage is equal to or greater than the reference value at the end of the second predetermined time period.

In the present invention, it is possible to determine whether the discharge circuit fails or breaks down and the capacitor cannot discharge or the contactor breaks down and the capacitor is kept connected to the main battery, if the capacitor voltage is equal to or greater than the reference value when a first predetermined time period passes after the capacitor starts to discharge. Moreover, if the capacitor voltage is lower than the reference value when the second predetermined time period passes after the start of the discharge, the contactor is opened and the electric charge of the capacitor is discharged by the discharge resistance. Therefore, it is possible to determine that the discharge circuit has failed though the contactor normally opens. Furthermore, if the capacitor voltage is equal to or higher than the reference value when the second predetermined time period passes after the start of discharge, and the contactor is kept closed and therefore, it is possible to determine that the capacitor is connected to the main battery.

The first predetermined time period ($T_1$) is the time period in which the capacitor voltage becomes lower than the reference value ($V_{REF}$), when the time ($T_1$) passes after the capacitor starts to discharge, which is set to 40 seconds in the embodiment. However, the time period ($T_1$) is a value which can be changed depending on the characteristics of the discharge circuit. The second predetermined time period ($T_2$) is the time period in which the capacitor voltage becomes lower than the reference value ($V_{REF}$) due to the discharge resistance when the time period ($T_2$) passes after the capacitor starts to discharge. Though the time period ($T_2$) is set to 5 minutes in the embodiment, it is a value which can be changed depending on the characteristic of the discharge resistance.

Though the reference value ($V_{REF}$) is set to 200 V in the embodiment, the value is a design characteristic which can be optionally set. Moreover, it is not always necessary that the reference value ($V_{REF}$) used when the first predetermined time period ($T_1$) passes, coincide with the reference value ($V_{REF}$) used when the second predetermined time period ($T_2$) passes. The reference values can be different from each other.

BRIEF DESCRIPTION OF THE DRAWINGS

FIG. 4 is a time chart for explaining the functions thereof.

DETAILED DESCRIPTION OF THE PREFERRED EMBODIMENT

Figure 1:
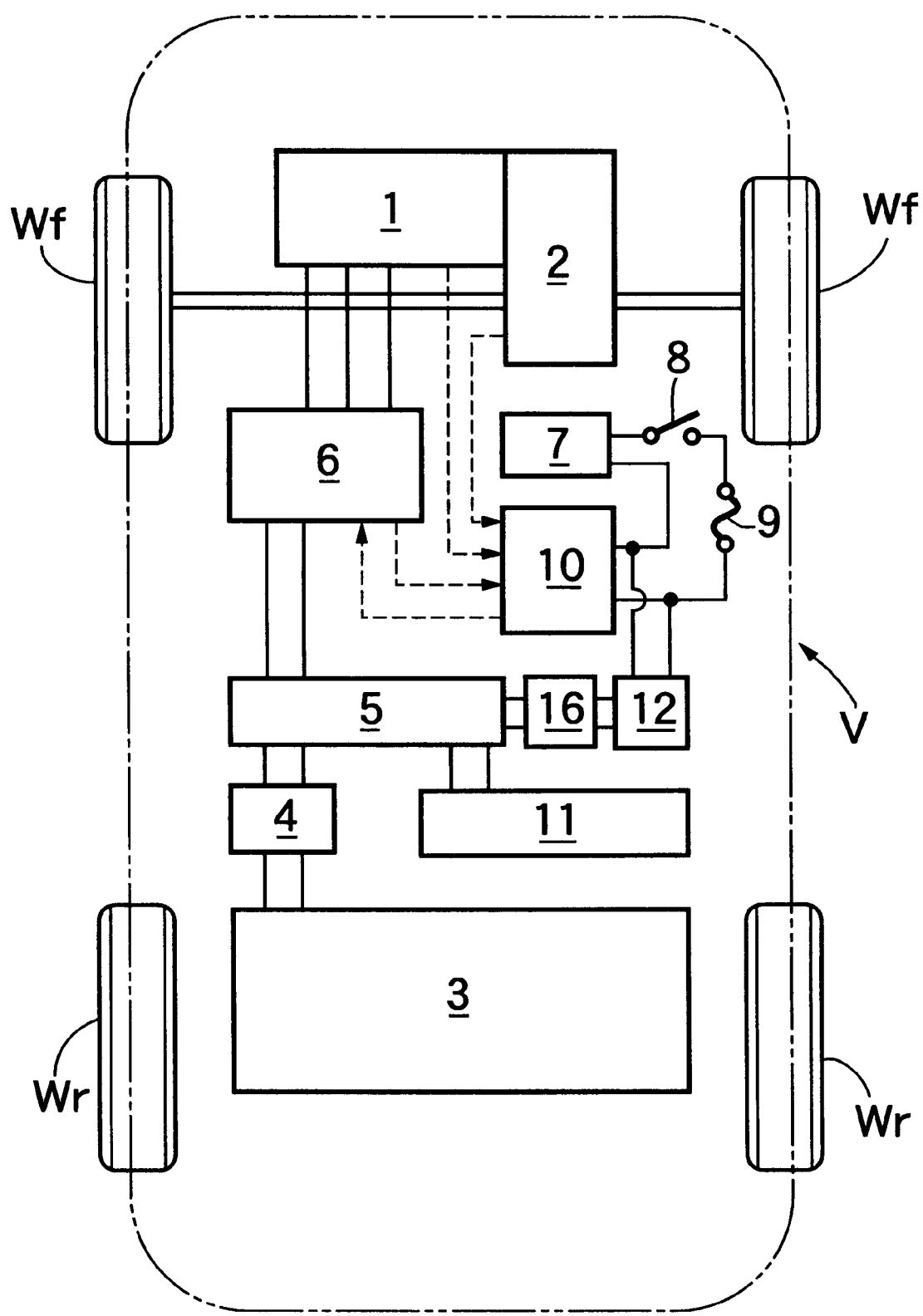
FIG. 1 is an illustration showing the entire structure of an electric vehicle according to an embodiment of the present invention.
Figure 2:
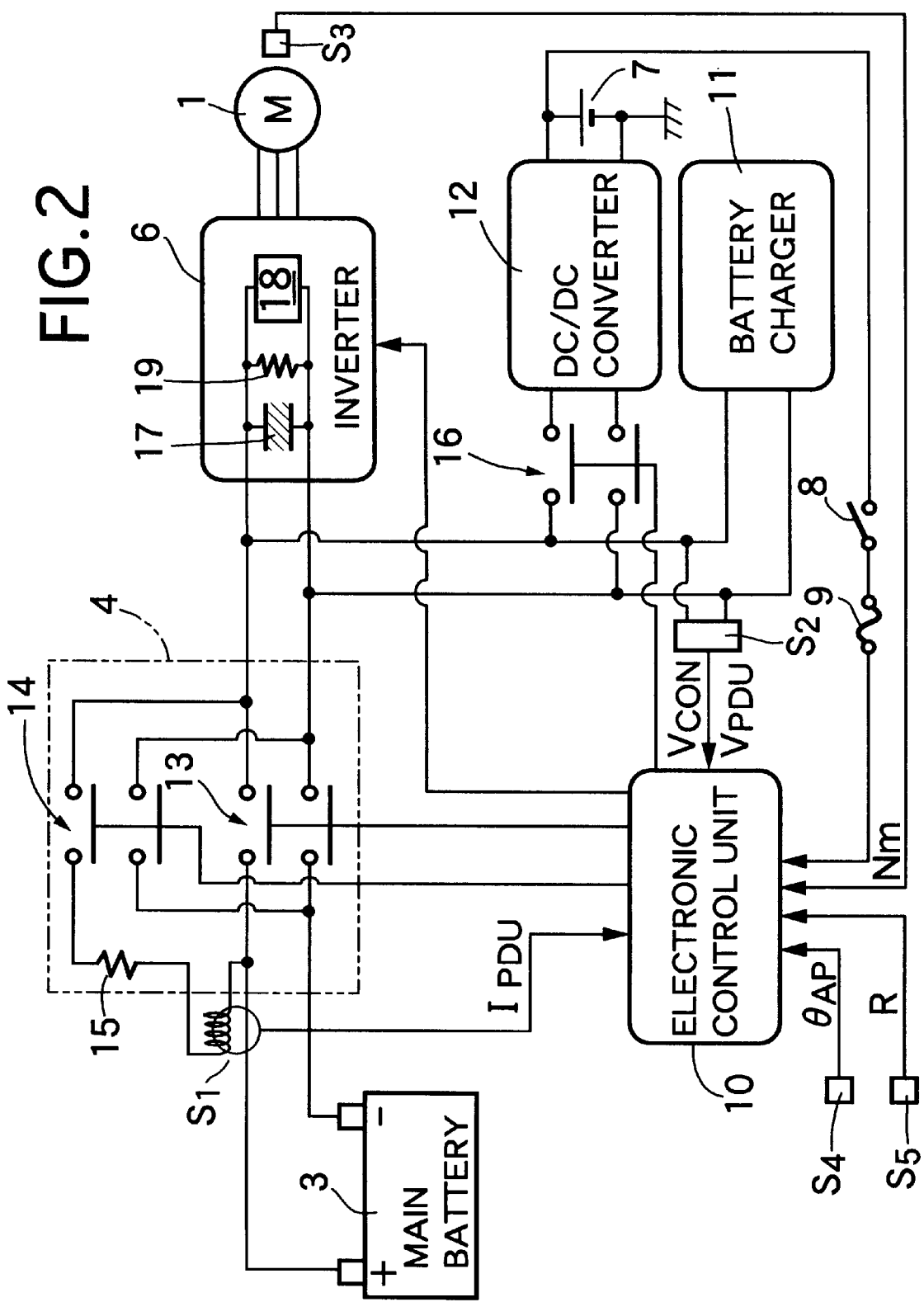
FIG. 2 is a block diagram of a control system according to the embodiment of the present invention.

As shown in FIGS. 1 and 2, a four-wheel electric vehicle V has a pair of right and left front wheels Wf and Wf serving as driven wheels to which the torque of a traveling motor 1 comprising a three-phase AC motor, is transmitted through a differential 2. A pair of right and left rear wheels Wr and Wr serve as follower wheels. A power drive unit comprises a main battery 3 of, for example 288 volts, mounted on the rear of the electric vehicle V and connected to the traveling motor 1 through an inverter 6, a contactor 4, and a junction box 5. An electronic control unit 10 is connected to a sub-battery 7 of, for example 12 volts, through a main switch 8 and a fuse 9, and is connected to the inverter 6 in order to control the driving torque and regenerative torque of the traveling motor 1. The junction box 5 is connected to a battery charger 11 in order to charge the main battery 3 by the electric power supplied form an external power supply and, is connected to a DC/DC converter 12 in order to charge the sub-battery 7 by the electric power of the main battery 3.

The contactor 4 is provided with a main contactor 13 and a precharge contactor 14 connected in parallel to each other and the precharge contactor 14 is connected in series with a precharge resistor 15. Moreover, the DC/DC converter 12 is connected to the main battery 3 through a charge control contactor 16. Opening or closing of the main contactor 13, precharge contactor 14, and charge control contactor 16 is controlled by the electronic control unit 10.

A current sensor $S_1$ for a DC section connecting the main battery 3 with the inverter 6, is used for detection of current $I_{PDU}$ flowing through the main contactor 13 and detection of current $I_{PDU}$ flowing through the precharge contactor 14. The current $I_{PDU}$ flowing through the precharge contactor 14 and the precharge resistor 15, is smaller than the current $I_{PDU}$ flowing through the main contactor 13. Therefore, by winding a one turn coil on a conductive wire connected to the main contactor 13 and winding a plural turn coil on a conductive wire connected to the precharge contactor 14, it is possible to detect a large current flowing through the main contactor 13 and a small current flowing through the precharge contactor 14 using the common current sensor $S_1$ with the same accuracy. The current sensor $S_1$ is connected to the electronic control unit 10.

A voltage sensor $S_2$ connected to the electronic control unit 10, detects a voltage $V_{PDU}$ of the DC section for connecting the main battery 3 with the inverter 6 while the electric vehicle V travels and, detects a voltage $V_{CON}$ of a capacitor 17, while the capacitor 17 discharges, after the traveling of the electric vehicle V stops. A motor rotational speed Nm detected by a motor rotational speed sensor $S_3$, accelerator opening degree $\theta_{AP}$ detected by an accelerator opening degree sensor $S_4$, and a shift range R detected by a shift range sensor $S_5$ are inputted to the electronic control unit 10.

The inverter 6 is provided with a plurality of switching elements. Therefore, by inputting a switching signal to each switching element from the electronic control unit 10, the inverter 6 converts the DC electric power of the main battery 3 into three-phase AC electric power to supply it to the traveling motor 1 when the traveling motor 1 operates and converts the three-phase electric power generated by the traveling motor 1 into DC electric power to supply it to the main battery 3 when the traveling motor 1 is driven (at the time of regeneration). The smoothing capacitor 17 which comprises an electrolytic capacitor, is connected in parallel between high-potential and low-potential input terminals of the inverter 6.

The capacitor 17 is connected in parallel with a discharge circuit 18 and a discharge resistor 19 respectively. The discharge circuit 18 is operated in accordance with a command supplied from the electronic control unit 10, to discharge the electric charge of the capacitor 17 within 40 seconds which is a first predetermined time period $T_1$ after the contactor 4 is turned off. The discharge resistor 19 discharges the electric charge of the capacitor 17 when the discharge circuit 18 is not working properly. The resistor 19 has a relatively large resistance and slowly discharges the electric charge of the capacitor 17 within 5 minutes from the time when the contactor 4 is turned off which is a second predetermined time period $T_2$ and is longer than the first predetermined time period $T_1$.

The inverter 6 is controlled in PWM (pulse width modulation) manner in the region of the low rotational speed side of the traveling motor 1 and controlled in a manner of so-called field-weakening control in the region of the high rotational speed side of the motor 1 after the duty ratio of the PWM control reaches 100%. The field-weakening control provides a field current component for the primary current to be supplied to the traveling motor 1, so that a magnetic field in the opposite direction to the magnetic field generated by a permanent magnet of the traveling motor 1 is generated, which extends the rotational speed of the traveling motor 1 to the high rotational speed side by weakening the entire magnetic field.

Then, functions of the electric vehicle V during traveling are described below.

The electronic control unit 10 calculates a torque command value $Q_{TRQ}$ to be generated in the traveling motor 1 by a driver, in accordance with the motor rotational speed Nm detected by the motor rotational speed sensor $S_3$, accelerator opening degree $\theta_{AP}$ detected by an accelerator opening degree sensor $S_4$, and shift range R detected by the shift range sensor $S_5$, by using a preset torque map. The unit 10 calculates a target electric power to be supplied to the traveling motor 1 or to be taken from the traveling motor 1 through regeneration, by multiplying the torque command value $Q_{TRQ}$ by the motor rotational speed Nm detected by a motor rotational speed sensor $S_3$. The target electric power has a positive value or negative value. Positive target electric power corresponds to the situation in which the traveling motor 1 generates driving torque, and negative target electric power corresponds to the situation in which the traveling motor 1 generates regenerative torque.

The electronic control unit 10 calculates actual electric power inputted to the inverter 6 by multiplying the current $I_{PDU}$ of the DC section of the inverter 6 detected by the current sensor $S_1$ by the voltage $V_{PDU}$ of the DC section of the inverter 6 detected by the voltage sensor $S_2$. The actual electric power has a positive value or negative value the same as the target electric power does. Positive electric power corresponds to the situation in which the traveling motor 1 generates a driving torque and negative actual electric power corresponds to the situation in which the traveling motor 1 generates regenerative torque. Moreover, the electronic control unit 10 compares the target electric power with the actual electric power and feedback-controls the traveling motor 1 in order to converge the deviation between the target electric power and the actual electric power to zero.

Figure 3:
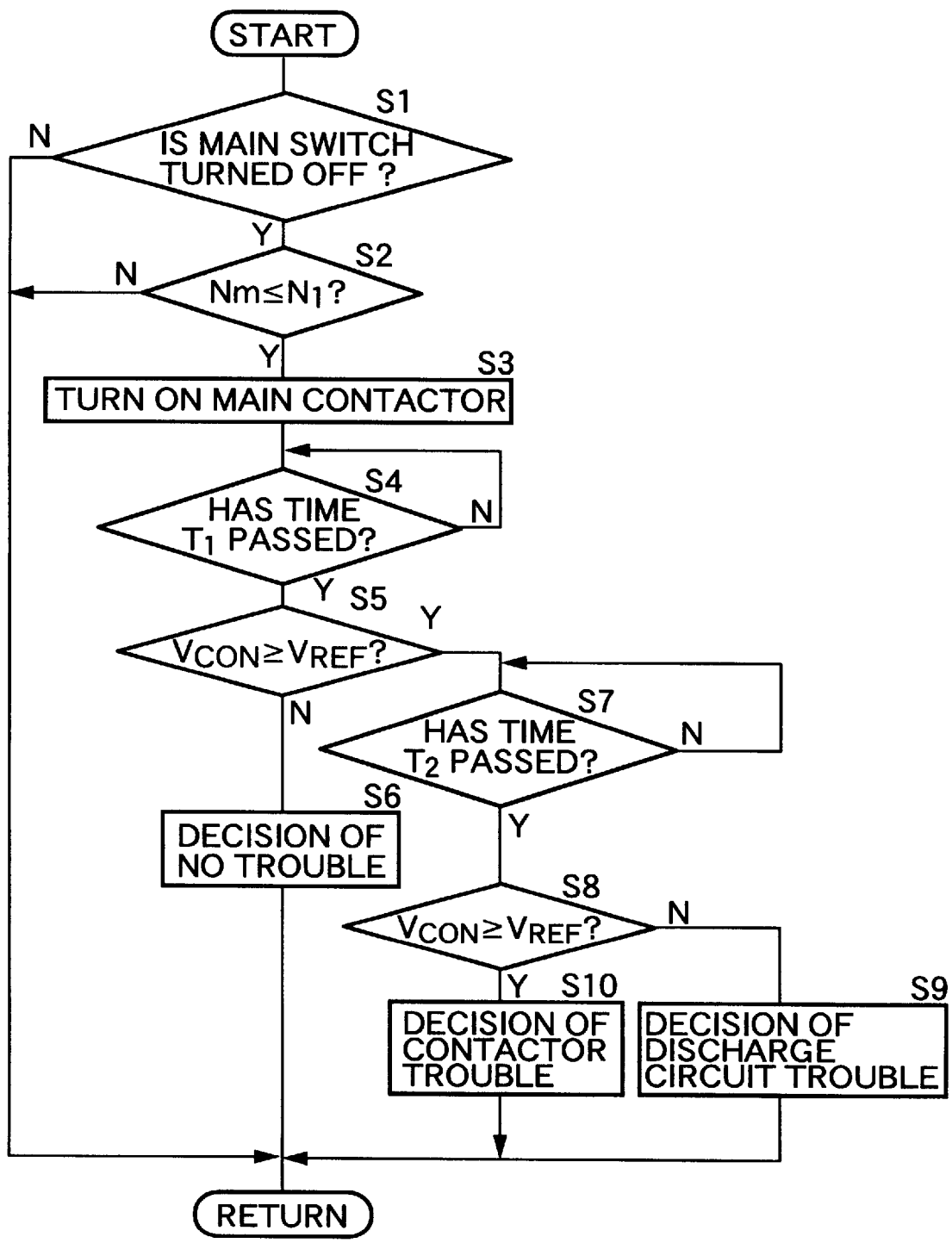
FIG. 3 is a flow chart for explaining the functions thereof.

The trouble detecting functions of the capacitor 17 provided for the inverter 6 are described below by referring to the flow chart in FIG. 3.

First, a main switch 8 is turned off in order to stop the electric vehicle V in Step S1, then it is confirmed that the motor rotational speed Nm has decreased to a predetermined value $N_1$ or less in Step S2, and thereafter the main contactor 13 is turned off in Step S3. Step S2 is executed because if the motor rotational speed Nm exceeds the predetermined value $N_1$ when the main contactor 13 is turned off, normal discharge of the capacitor 17 may be prevented by the regenerative electromotive force.

When the period of 40 seconds which is the first predetermined time period $T_1$ passes after the main contactor 13 is turned off in Step S4, the detected capacitor voltage $V_{CON}$ detected by the voltage sensor $S_2$ in Step S5 is compared with 200 V which is the reference value $V_{REF}$. As a result, when the capacitor voltage $V_{CON}$ is lower than the reference value $V_{REF}$, it is decided in Step S6 that the main contactor 13 and precharge contactor 14 are normally turned off, the discharge circuit 18 is normally operated, and discharge of the capacitor 17 is completed.

When the capacitor voltage $V_{CON}$ is equal to or higher than the reference value $V_{REF}$ in Step S5, Step S7 holds for a period of 5 minutes, which is the second predetermined time period $T_2$, and the capacitor voltage $V_{CON}$ is compared with the reference value $V_{REF}$ again in Step S8 after the second predetermined time period $T_2$ passes. As a result, when the capacitor voltage $V_{CON}$ is lower than the reference value $V_{REF}$, that is, when the capacitor voltage $V_{CON}$ is lower than the reference value $V_{REF}$, after the second predetermined time period $T_2$, though the capacitor voltage $V_{CON}$ is equal to or greater than the reference value $V_{REF}$ after the first predetermined time period $T_1$, it is decided in Step S9 that the discharge circuit 18 has a problem while the contactor 4 is normally turned off and the discharge of the capacitor 17 is executed by the discharge resistor 19 instead of the discharge circuit 18. Moreover, when the capacitor voltage $V_{CON}$ is equal to or higher than the reference value $V_{REF}$ in Step S8, it is decided in Step S10 that discharge of the capacitor 17 cannot be performed because the contactor 4 has failed and is fixed to a turned-on state independently of whether the discharge circuit 18 is normal or abnormal.

In short, when the capacitor voltage $V_{CON}$ is equal to or greater than the reference value $V_{REF}$ in Steps S4 and S5, after the first predetermined time period $T_1$, it is possible to determine that at least either of the contactor 4 or discharge circuit 18 is abnormal. When the capacitor voltage $V_{CON}$ is lower than the reference value $V_{REF}$ in Steps S7 and S8 after the second predetermined time period $T_2$, it is possible to decide in Step S9 that the discharge circuit 18 has a problem. However, when the capacitor voltage $V_{CON}$ is equal to or greater than the reference value $V_{REF}$, it is possible to decide in Step S10 that the contactor 4 has a problem.

Thus, because it is possible to clearly determine a problem in the discharge circuit 18 or contactor 4, it is possible to repair the circuit 18 or contactor 4 immediately after trouble occurs.

Then, the above functions are further described below by referring to the time chart in FIG. 4.

When a short time passes after the main switch 8 is turned off and the electronic control unit 10 is ready for operation, the contactor 4 is turned off and, at the same time, the discharge circuit 18 operates to discharge the electric charge of the capacitor 17. In this case, when the contactor 4 is normally turned off and the discharge circuit 18 normally operates, the capacitor voltage $V_{CON}$ slowly lowers from 288 V, as shown by (A) in FIG. 4 and becomes lower than 200 V, which is the reference value $V_{REF}$ after a period of 40 sec, which is the first predetermined time period $T_1$.

When the discharge circuit 18 does not normally function even after the contactor 4 is turned off, the capacitor voltage $V_{CON}$ slowly drops from 288 V as shown by (B) in FIG. 4 and becomes lower than 200 V which is the reference value $V_{REF}$ after the period of 40 seconds, which is the first predetermined time period $T_1$, and a period of 5 minutes which is the second predetermined time period $T_2$ because the electric charge of the capacitor 17 is discharged slowly through the discharge resistor 19.

Furthermore, unless the contactor 4 is normally turned off, the capacitor voltage $V_{CON}$ is kept at 288 V, which is equal to or greater than the reference value $V_{REF}$, even after the period of 5 minutes which is the second predetermined time period $T_2$, as shown by (C) in FIG. 4, independently of whether the discharge circuit 18 is normal or abnormal.

As described above, a control means determines that a discharge circuit has failed if a capacitor voltage is equal to or higher than a reference value when a first predetermined time passes after start of discharge, and if the capacitor voltage is lower than the reference value when a second predetermined time passes after start of discharge. The control means also determines that a contactor has failed if the capacitor voltage is equal to or higher than the reference value when the second predetermined time passes after start of discharge. Therefore, it is possible to clearly determine and identify that the discharge circuit or contactor has failed and prevent problems in the discharge of the contactor in advance.

The embodiment of the present invention is described above in detail. Moreover, various modifications of the present invention are allowed as long as they are not deviated from the gist of the present invention.

We claim:

1. A control system for an electric vehicle, comprising:

a main battery;

a traveling motor;

an inverter for converting DC electric power of the main battery into AC electric power to drive the traveling motor;

a contactor connected between the main battery and the inverter;

a smoothing capacitor connected in parallel with the inverter;

a discharge circuit connected in parallel with the inverter to discharge electric charge of the capacitor, within a first predetermined time period;

a discharge resistor connected in parallel with the capacitor, for discharging the electric charge of the capacitor within a second predetermined time period, the second time period being longer than the first predetermined time period; and control means for starting the discharge of the capacitor by operating a discharge circuit when opening the contactor; wherein the control means determines a failure of the discharge circuit if a capacitor voltage is equal to or greater than a reference value at the end of the first predetermined time period and is lower than the reference value at the end of the second predetermined time period, and further determines a failure of the contactor if the capacitor voltage is equal to or greater than the reference value at the end of the second predetermined time period.

2. A control system for an electric vehicle as set forth in claim 1, wherein said first and second predetermined time periods begin when the capacitor starts to discharge.

3. A control system for an electric vehicle as set forth in claim 1, wherein the first predetermined time period is 40 seconds.

4. A control system for an electric vehicle as set forth in claim 3, wherein the second predetermined time period is 5 minutes.

* * * * *